US011689531B2

(12) United States Patent
Chen Kaidi (10) Patent No.: US 11,689,531 B2
(45) Date of Patent: Jun. 27, 2023

(54) DYNAMIC IP ADDRESS WHITELISTING

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 396 days.

(21) Appl. No.: 16/912,209

(22) Filed: Jun. 25, 2020

(65) Prior Publication Data

US 2021/0409411 A1  Dec. 30, 2021

(51) Int. Cl.
*H04L 9/40* (2022.01)
(52) U.S. Cl.
CPC ........ *H04L 63/101* (2013.01); *H04L 63/1408* (2013.01); *H04L 63/20* (2013.01)
(58) Field of Classification Search
CPC .... H04L 63/101; H04L 63/1408; H04L 63/20
USPC ............................................................ 726/3
See application file for complete search history.

(56) References Cited

U.S. PATENT DOCUMENTS

2017/0250989 A1* 8/2017 Bhattacharya ........ H04L 63/101

* cited by examiner

*Primary Examiner* — Anthony D Brown
(74) *Attorney, Agent, or Firm* — Haynes and Boone, LLP (57) ABSTRACT

Systems and methods for dynamic IP address whitelisting are disclosed. These techniques allow for better management of IP addresses and improve computer system and network security. In one embodiment, a system may execute a first task, at a first frequency, that includes determining, based on registered account activities corresponding to registered accounts with a service provider, at least one IP address associated with at least one registered account with the service provider. The first task may further include adding the at least one IP address to a dynamic whitelist (e.g., allowlist) of IP addresses. The system may execute a second task, at a second frequency, that includes removing, from the dynamic whitelist, at least one existing IP address identified as inactive. Thus, in various embodiments, inactive IP addresses can be removed from a whitelist while active IP addresses are periodically re-verified.

20 Claims, 5 Drawing Sheets

DYNAMIC IP ADDRESS WHITELISTING

TECHNICAL FIELD

The present disclosure generally relates to network security and more particularly to network security utilizing dynamic IP address whitelisting according to various embodiments.

BACKGROUND

Whitelisting can be used as a security feature in relation to limiting and controlling access to resources such as a particular privilege, system, service, protocol, resource, and so forth. In the context of computer network security, an Internet Protocol (IP) address whitelist may contain a list of IP addresses associated with endpoints that are permitted to access certain network or system information and/or services of a service provider or entity system. As IP addresses are relinquished, sometimes without any notice to the service provider, a static whitelist of the service provider may become outdated with stale IP addresses (e.g., IP addresses that are no longer assigned to the original user when the IP address was whitelisted). A network security issue may arise when a stale IP address is later recycled and assigned to/used by another party or user who was not originally whitelisted in association with the IP address before it became stale. In some cases, the new party that now controls/uses the IP address could then have a greater level of access to resources that the whitelist was intended to protect. Therefore, there exists a need in the art for techniques related to dynamic IP address whitelisting to allow for a whitelist to stay up to date and reduce and/or eliminate network security issues that arise from the recycling of stale IP addresses.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

This specification includes references to "one embodiment," "some embodiments," "an embodiment," "various embodiments," etc. The appearances of these phrases do not necessarily refer to the same embodiment. However, it will be appreciated that particular features, structures, and/or characteristics may be combined in a suitable manner consistent with this disclosure.

"First," "second," and so forth are used herein to describe various embodiments. Such terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not turned on). Reciting that a component is "configured to" perform one or more tasks is expressly intended not to invoke 35 U.S.C. § 112(f) for that component.

In the context of computer network security, IP address whitelisting allows endpoints associated with certain IP addresses existing on the IP whitelist to access certain network or system information/resources and/or services of a service provider or entity system. As IP addresses can become stale (e.g., relinquished by a user), oftentimes without any notice to the service provider, a static whitelist of the service provider may become outdated with stale IP addresses. A network security issue may arise when the stale IP address is later recycled and used by another party who was not originally whitelisted in association with the IP address before it became stale. In some cases, the new party that now controls/uses the IP address may then have a greater level of access to resources that the whitelist was intended to protect. The present disclosure describes systems and methods for dynamic whitelisting to allow for a whitelist to stay up to date and reduce and/or eliminate the network security issues that arise from the recycling of stale IP addresses. As a further example, an IP address may be recycled when an entity (e.g. Internet Service Provider or ISP) that allocates the IP address reassigns the IP address to a new party. A business or other entity that had a first IP address on a whitelist may go bankrupt, transfer its online services to a new ISP, etc. The ISP that retains control of the original IP address may then allocate that IP to another business or other entity that should not be on the whitelist.

In some embodiments, systems and methods for dynamic IP address whitelisting may include executing a first task at a first frequency. For example, the first task may include determining, based on registered account activities (e.g., Application Programming Interface (API) calls, transactions, and/or related activities) associated with registered accounts with a service provider, at least one IP address associated with at least one registered account with the service provider. The first task may further include adding the at least one IP address to a dynamic whitelist (e.g., dynamic allowlist) of IP addresses, where IP addresses on the dynamic whitelist have greater access privileges (e.g., are less limited) to services (e.g., computer network services or content) of the service provider or require less stringent authentication (e.g., a password as compared to a biometric) than IP addresses excluded from the dynamic whitelist. The systems and methods may further include executing a second task at a second frequency. For example, the second task may include removing, from the dynamic whitelist, at least one existing IP address identified as inactive. For example, the IP address may be identified as inactive if there is an absence of network traffic to the service provider stemming from the IP address for a predefined time period. As such, the dynamic whitelist may change and adapt according to scheduled intervals of tasks to ensure that the whitelist is up to date and stale IP addresses are filtered out of the whitelist.

In further embodiments, the systems and methods may include executing a third task at a third frequency. The third task may include updating the dynamic whitelist based on any changes to the IP addresses on the dynamic whitelist. For example, after an IP address has been added to the dynamic whitelist, the IP address may be determined to be associated with malicious use. In such cases, a risk score or reputation of the IP address may be assigned or changed to reflect the association with malicious use. The third task may filter and remove any IP addresses from the dynamic whitelist if its risk score or reputation exceeds a predefined threshold. In some embodiments, the IP address may be tagged to indicate that it has been identified as being associated with malicious use but may remain on the dynamic whitelist. In some cases, IP addresses may be copied from the dynamic whitelist to a secondary or local whitelist for further security and risk analysis at different security layers of an entity system (e.g., each security layer may have its own secondary whitelist from which it operates). In other embodiments, IP addresses that are tagged after their addition to the dynamic whitelist may be filtered by tag and removed during the third tag based on their updated tag. For example, the tag may indicate the risk score, reputation, any security risk events that have occurred in association with the IP address, and so forth.

Embodiments of a dynamic whitelist discussed in the present disclosure improve over prior IP address whitelist techniques by providing a continuously updated whitelist with active IP addresses where inactive and risky IP addresses may be filtered out. Thus, the dynamic nature of the whitelist provides for a more secure IP address whitelist, resulting in improved network security, including protection of sensitive data and reduction of fraudulent online activity/transactions. Additional advantages of the subject technology will be further apparent in view of the description below.

Figure 1:
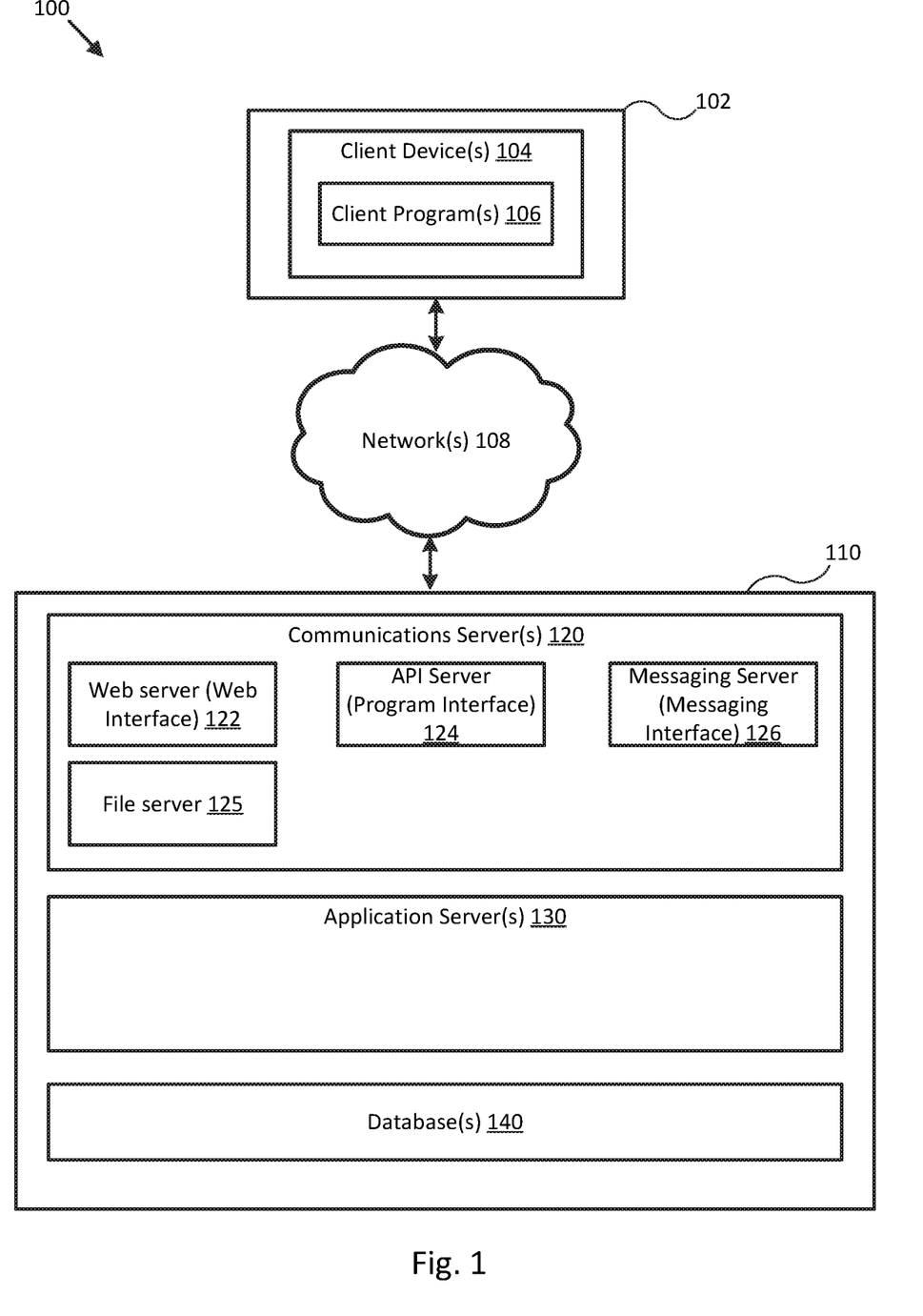
FIG. 1 illustrates a block diagram of a networked system suitable for implementing one or more embodiments of the present disclosure.

FIG. 1 illustrates an exemplary embodiment of a computing system adapted for implementing one or more embodiments disclosed herein. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It will be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a personal computing device, a mobile computing device, a tablet, a smart phone, an electronic wearable device (e.g., smart watch, virtual reality headset), or other similar devices that a user may readily access.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, macOS, Android, Embedix OS, Binary Runtime Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a merchant application, payment/transaction processing application, web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a Wide Area Network (WAN), a wireless WAN (WWAN), a wireless Local Area Network (WLAN), a mobile telephone network, a landline telephone network, personal area network, as well as other suitable networks. For example, client devices 104 may communicate with network-based system 110 over the Internet or other suitable WAN by sending and or receiving information via interaction with a website, computer application, e-mail, instant message (IM) session, and/or video messaging session. Any of a wide variety of suitable communication types between client devices 104 and system 110 may take place, as will be readily appreciated. In some instances, wireless communications such as Bluetooth, near-field communication, etc. may take place between client device 104 and system 110, such when mobile phones or other personal and/or mobile devices are used by a user in proximity to the system 110.

Network-based system 110 may comprise one or more communications servers 120 to provide suitable interfaces that enable communication using various modes of communication and/or via one or more networks 108. Communications servers 120 may include a web server 122, an API server 124, a file server 125, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, file server 125, and messaging server 126 may be structured, arranged, and/or configured to facilitate communication with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130. File server 125 may be arranged to allow a client to connect to file server 125 to upload files to be stored on file server 125 (e.g., cloud storage server) or to download files that are already stored on file server 125.

Application servers 130 of network-based system 110 may be servers that provide various services to client devices 104. These servers and/or components, which may be in addition to other servers, may be structured and arranged to various tasks further described herein. Application servers 130 may be coupled to and capable of accessing one or more databases 140. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. In some embodiments, databases 140 may include several database tables corresponding to specific types of information related to merchant and/or customer accounts, various whitelists, and other network security data described herein.

Figure 2:
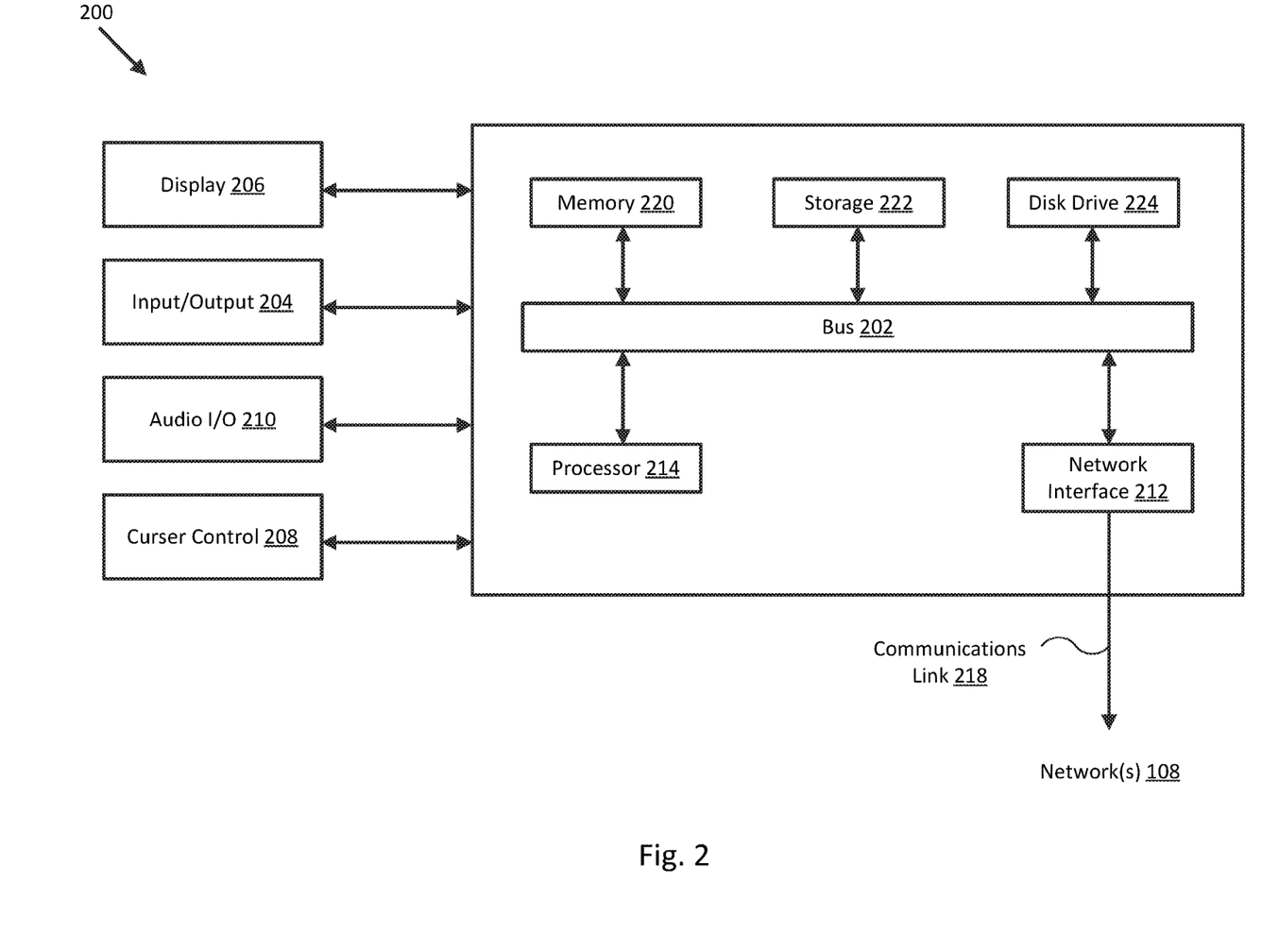
FIG. 2 illustrates a block diagram of a computer system in accordance with one or more embodiments of the present disclosure.

FIG. 2 illustrates an exemplary computer system 200 in block diagram format suitable for implementing one or more devices of the computing system described in reference to FIG. 1. In various implementations, a device that includes computer system 200 may comprise a personal computing device (e.g., a smart or mobile phone, a computing tablet, a personal computer, laptop, wearable device, PDA, any applicable device discussed herein) that is capable of communicating with network 108. For example, a service provider may utilize a network computing device (e.g., a network server) that includes computer system 200 and is capable of communicating with network 108. It should be appreciated that each of the devices utilized by users and service providers may be implemented as computer system 200 in a manner as follows.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more mechanical or touch screen buttons, links, actuatable elements, etc., and sends a corresponding signal to bus 202. I/O controller 204 may also be communicatively coupled to an output component, such as a display 206 and a cursor control 208 (such as a keyboard, keypad, mouse, touchscreen, etc.). In some examples, I/O controller 204 may include an image sensor such as a complementary metal-oxide semiconductor (CMOS) image sensor and/or the like for capturing images and/or video. An audio I/O component 210 may also be included to allow a user to input voice information that may be converted to audio signals that may be interpreted as commands and/or recordable data. Audio I/O component 210 may additionally allow the user to hear audio. In this regard, the audio I/O component 210 may be a microphone(s)/speaker(s).

A transceiver or network interface 212 transmits and receives signals between computer system 200 and other devices, such as another user device, a service provider server, an email server, application service provider, web server, and/or other servers via network 108. In various embodiments, such as for many cellular telephone and other mobile device embodiments, this transmission may be wireless, although other transmission mediums and methods may also be suitable. A processor 214, which may be a microcontroller, digital signal processor (DSP), or other processing component, processes these various signals, such as for display on computer system 200 or transmission to other devices over a network 108 via a communication link 218. Communication link 218 may be a wireless communication in some embodiments. Processor 214 may also control transmission of information, such as cookies, IP addresses, images, videos, and/or other data to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services and perform one or more operations, such as the services and operations discussed above and in further detail below.

Figure 3:
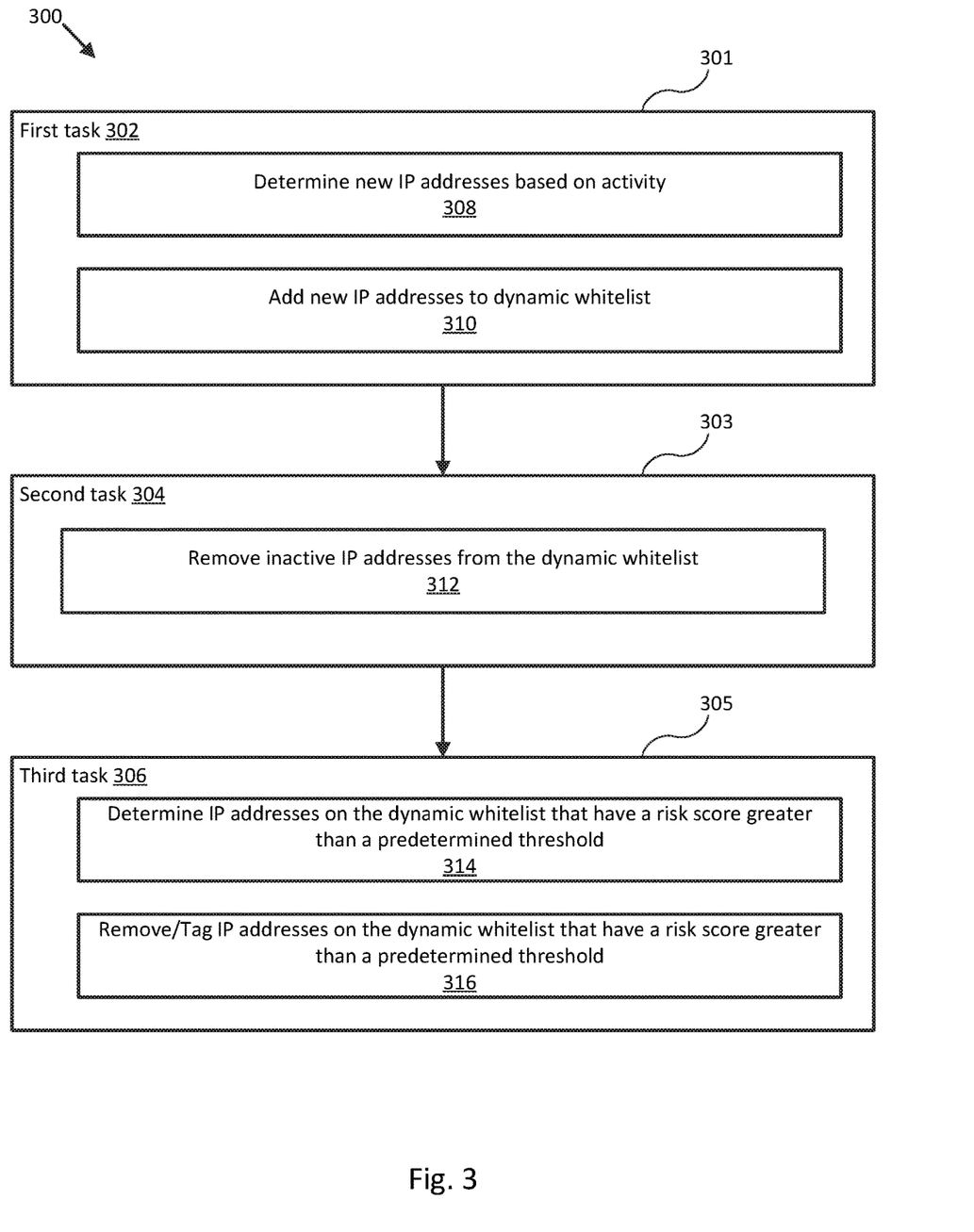
FIG. 3 illustrates a flow diagram of a process for dynamic whitelisting in accordance with one or more embodiments of the present disclosure.

Now referring to FIG. 3, illustrated is a flow diagram of a process 300 for improved network security utilizing dynamic whitelisting in accordance with one or more embodiments of the present disclosure. For explanatory purposes, the process 300 is primarily described herein with reference to FIGS. 4 and 5; however, the process 300 is not limited to FIGS. 4 and 5. The blocks of the process 300 are described herein as occurring in serial, or linearly (e.g., one after another) for ease of explanation. However, multiple blocks of the process 300 may occur in parallel. For example, the blocks 302, 304, and 306 may occur in parallel.

In addition, the blocks of the process 300 (or steps, sub-steps, or sub-processes therein) need not be performed in the order shown and/or one or more blocks (or steps, sub-steps, or sub-processes therein) may be omitted from or added to the process 300 (e.g. a step showing as occurring after another step in the diagram could be performed in parallel or previous to a preceding step, for example).

At block 301, a system executes a first task 302 at a first frequency. As explained below, the first task may include performing block 308 (determining one or more IP addresses to add to the dynamic whitelist based on their recent activity) and performing block 310 (adding the one or more IP addresses to a dynamic whitelist). For example, the first frequency may include scheduled time intervals where at each scheduled interval the first task is executed (e.g., performed, ran, repeated). To illustrate, a scheduled time interval may be every minute, hour, day, week, month, certain days, and/or at one or more intervals. The scheduled time interval may be varied from time to time.

Figure 4:
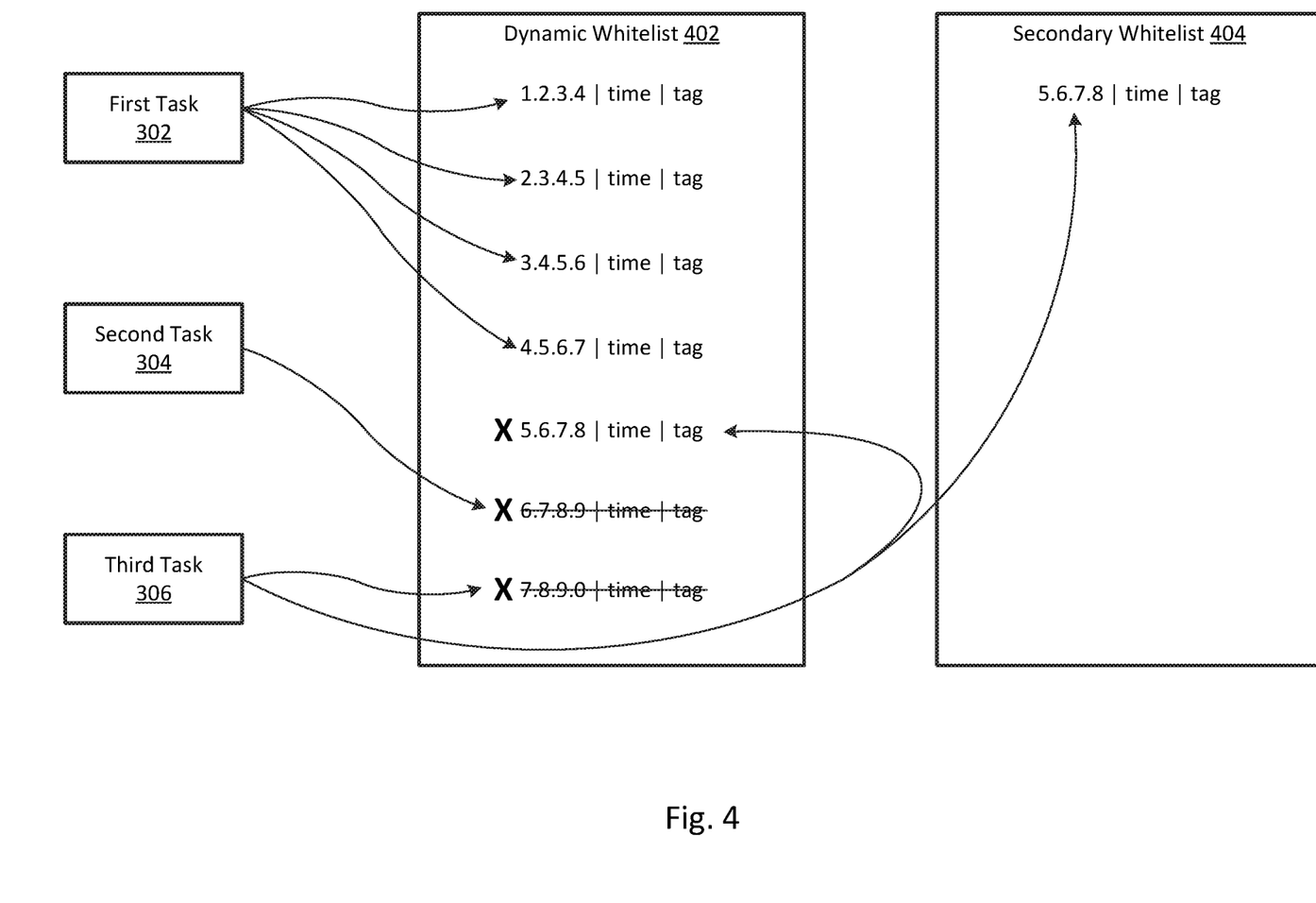
FIG. 4 illustrates a diagram for executing several tasks associated with generating and updating dynamic whitelists in accordance with one or more embodiments of the present disclosure.

At block 308 in execution of the first task 302, the system may determine one or more IP addresses to add to a dynamic whitelist 402 based on recent activity associated with the one or more IP addresses. The dynamic whitelist 402 may be a whitelist that provides, to accounts (e.g., user accounts) associated with the IP addresses on the dynamic whitelist 402, greater privileges (e.g., access to services or content) than accounts associated with IP addresses excluded from or otherwise not appearing on the dynamic whitelist 402. In other words, IP addresses on the dynamic whitelist 402 may be less limited in relation to service or content access of a service provider as opposed to IP addresses excluded from or otherwise not appearing on the dynamic whitelist 402. In some embodiments, IP addresses on the dynamic whitelist 402 may be allowed to pass through (e.g., evaluated at) particular security layers/mechanisms of the service provider (e.g., entity system) but not necessarily granted access to requested network services of the service provider (e.g., as discussed below with reference to global whitelists and local/secondary whitelists). In some embodiments, the dynamic whitelist may permit communications stemming from the IP addresses on the dynamic whitelist to access resource files/data (e.g., responses to API requests, code files such as HTML, CSS, and JavaScript files, assets such as Word documents, PDFs, text documents, images, music, video), access to services such as transaction processing, access a website or webpage. In some embodiments, the dynamic whitelist may allow IP addresses to exceed a threshold number of transaction requests per allotted time (e.g., transaction processing per minute), or credit card validation requests per allotted time (e.g., credit card validation requests per minute).

According to various embodiments, determining the one or more IP addresses may be based on account activities corresponding to accounts with the service provider. For example, the accounts may be merchant accounts or customer accounts registered or in a pre-registration process with the service provider. In some embodiments, the system may determine whether the account is a customer account or merchant account before determining whether the account activity qualifies the account as being active. For example, if a user account is a merchant account, an activity associated with the account may qualify as an activity showing that the account is active whereas the same activity may not qualify as an activity showing that the account is active for a customer account, and vice versa. In one case, the system may determine an account identifier for traffic associated with the IP address or use an IP address-to-account lookup table to determine whether the account is a customer account or merchant account.

The system may determine the recent account activities that have occurred for an account associated with an IP address within a past timeframe to identify whether the account and IP address are active according to various implementations. For example, account activities may include performance of an API call, performance of or logged entry of a transaction, onboarding or registration/sign-up of the account, login of the account, opening emails or messages sent from the service provider to the account or an email address associated with the account (e.g., detecting a hyperlink opened through the email), and/or other related activities that are detected by the system as network traffic incoming/stemming from an IP address associated with the account. In other words, the system may detect incoming network traffic from the IP address associated with the account and determine such to be an activity.

In various instances, the incoming network traffic may be analyzed to determine if one or more specific accounts of a service provider are associated with that traffic. For example, and API call may have a tag, customer number, and/or other unique identifier (within the service provider system) that indicates that activity corresponds to a specific account. An account login attempt may have a unique username and/or email address that also identifies an associated account. Thus, by analyzing the traffic, it can be determined if a corresponding account is relevant to that traffic. Depending on the activity involved no relevant account indicator might be present and thus this activity might not be used to dynamically manage an IP address whitelist, according to some embodiments.

In an embodiment, the network traffic that stemmed from the IP address (e.g., activity) and its associated time(s) of occurrence may be analyzed to determine whether it occurred within a predefined timeframe (e.g., within a certain number of weeks such as the past two weeks, within a certain number of hours such as the past two hours, during a time period since the last execution of the first task) to be considered recent. If the network traffic stemming from the IP address is determined to have occurred within the predefined timeframe, the system may identify the activity as recent and queue the IP address to be added to the dynamic whitelist 402 (pending any further verifications as discussed below) as the IP address may be considered active rather than inactive (e.g., stale, abandoned, relinquished, outdated).

In some embodiments, the one or more IP addresses that are queued to be added to the dynamic whitelist 402 may be timestamped with the time of the most recent activity (e.g., incoming network traffic) stemming from the IP address. For example, the timestamp may be included in metadata accompanying the IP address on the dynamic whitelist 402. The timestamp may be analyzed during execution of a third task 306 later discussed in the present disclosure.

Before adding the one or more IP addresses to the dynamic whitelist 402, the system may confirm/verify that the one or more IP addresses are new relative to IP addresses currently existing on the dynamic whitelist 402. For example, the system may cross-check the one or more IP addresses that were determined at block 308 against existing IP addresses on the dynamic whitelist 402. An IP address that is not already on the dynamic whitelist 402 may constitute a new IP address according to an embodiment. Thus, the system may avoid duplicating IP addresses on the dynamic whitelist 402 as IP addresses that already exists on the dynamic whitelist may not be added again during the current execution of the first task 302 according to some embodiments. In response to determining that the IP address already exists on the dynamic whitelist 402, the timestamp of the IP address may be updated to indicate the most recent logged activity for the IP address according to various embodiments.

In addition, further verifications may be performed before adding the one or more IP addresses to the dynamic whitelist 402. For example, the system may cross-check the one or more IP addresses against a black list (e.g., blocklist) or red list (e.g., red flag list) that represents IP addresses that have been identified to be associated with malicious use. For example, a threat intelligence system running in conjunction with the system performing the process 300 may identify IP addresses that have been associated with malicious use and may have placed such IP addresses on the black/red list in a database that is available to other systems of the service provider. When the system determines that any of the one or more IP addresses exist on the black/red list, the system may refrain from adding such IP addresses to the dynamic whitelist 402. However, in some embodiments, the system may continue with adding such IP addresses identified to exist on the black/red list to the dynamic whitelist 402 but may tag such IP addresses with an indication that the IP address is associated with malicious use and/or a percentage of traffic from the IP address that is associated with malicious use. In an example, a tag may be, may be part of, or may include metadata linked to the IP address that is placed on the dynamic whitelist 402. Tags may be used where multiple accounts are acting through a shared IP address and not all of the multiple accounts have been identified as associated with malicious use. Blocking at an application or account level to filter out the malicious user accounts acting through the shared IP address may be more helpful than at the IP address level in such cases. The IP address may be whitelisted to allow traffic from the IP address through while a subset of traffic from that IP address associated with malicious user accounts may be blocked at/by different security layers/mechanisms or downstream systems based on the tags. In some embodiments, systems and/or security layers of a service provider (e.g., one or more of security layers 502a-502j of FIG. 5) may evaluate the tags of IP addresses on the dynamic whitelist 402. For example, one security layer in a service provider system may allow incoming traffic from all IP addresses on the dynamic whitelist 402 such as to perform security analysis of the traffic stemming from the IP addresses, while another security layer downstream in the service provider system may filter out incoming traffic from IP addresses on the dynamic whitelist 402 that have a tag indicating the IP address has an association with malicious use (e.g., one or more accounts linked to the IP address has been identified as associated with malicious use).

Similarly, in some embodiments, the system may cross-check the one or more IP addresses against a black and/or red list that represents IP addresses that have been rate-limited (e.g., limited in the amount of API requests, transactions, service use, etc. that can be performed within a certain timeframe). Such IP addresses that have been rate-limited may have been rate-limited for exceeding a threshold number of allowable API requests or transactions for a certain time period that would indicate the IP address is risky or potentially associated with malicious use. As a non-limiting, illustrative example, an IP address that has sent numerous API requests to confirm validity of credit card numbers over a short period of time may represent an abusive use of the services of the service provider and the service provider may have rate-limited incoming traffic from that IP address.

Figure 5:
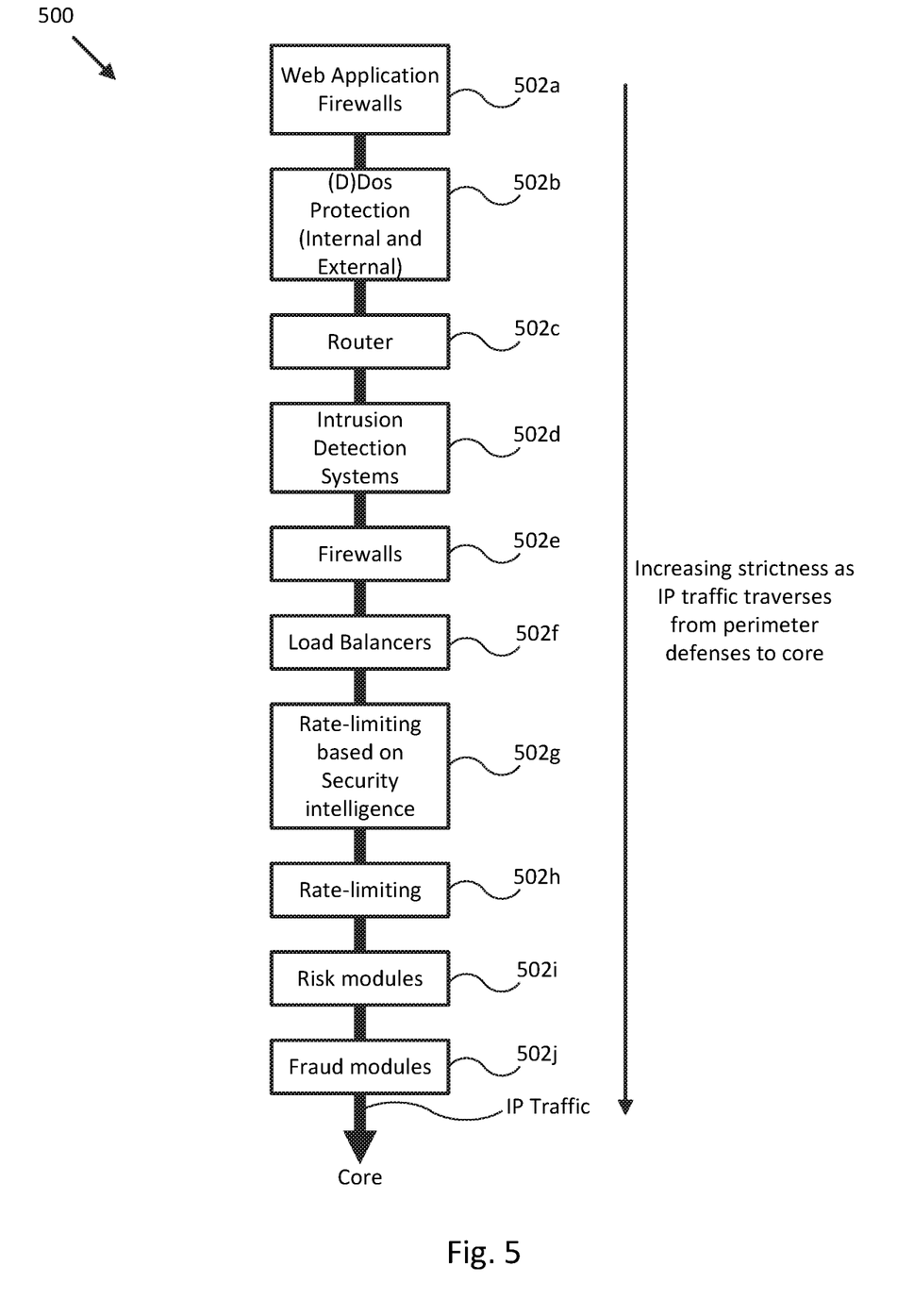
FIG. 5 illustrates a diagram of network security defense layers in accordance with one or more embodiments of the present disclosure.

In one case, a rate-limiting security layer 502g of the service provider may have rate-limited the IP address after performing an analysis of the incoming network traffic from the IP address. When the system determines that any of the one or more IP addresses determined at block 308 exist on the rate-limited black/red list (e.g., by querying a database storing the rate-limited black/red list for whether the one or more IP addresses are on the rate-limited black/red list), the system may refrain from adding such IP addresses to the dynamic whitelist 402. However, in some embodiments, the system may continue with adding the IP addresses identified to exist on the rate-limited black/red list to the dynamic whitelist 402 but may tag such IP addresses with an indication that the IP address has been rate-limited.

In further embodiments, the system may determine additional information related to the one or more IP addresses. For example, the system may determine whether the IP address is dedicated and/or statically assigned. For example, a dedicated IP address may be an IP address that is used solely by a merchant or customer. Knowing whether the IP address is dedicated may be valuable information as the merchant or customer may be responsible for any malicious traffic originating from the dedicated IP address. In some cases, the system may determine whether an IP address is dedicated based on a browser fingerprint, user-agent, etc. of the unique machine from which the IP traffic is originating. A static IP address may mean that the IP address does not change for the merchant or customer. In some embodiments, where an IP address is non-static, the system may tag the IP address with an indication that the IP address is non-static, and during the second task 304 or third task 306 discussed below, may remove such IP addresses from the dynamic whitelist 402 if the IP address has been inactive for a shorter time period (e.g., half of a default timeframe) than IP addresses having a tag of static. Having a shorter time period for inactivity for static IP addresses may reduce the likelihood of the IP address changing possession, without notice to the service provider, after it has been whitelisted. In some embodiments, the system may determine whether an IP address is static or not by using WHOIS or any other query and response protocol for querying databases that store the registered users or assignees of an IP address. The system may tag IP addresses with an indication of whether they are dedicated or static prior to being added to the dynamic whitelist 402 in some embodiments.

According to one or more embodiments, the system may determine domain reputation information related to the one or more IP addresses. For example, the system may perform a Domain Name System (DNS) reverse lookup to determine domains that are associated with the one or more IP addresses. The determined domains may be compared against a list of domains in a database available to the system to determine whether any of the one or more IP addresses are associated with any malicious domains. In some embodiments, the system may refrain from adding any of the one or more IP addresses to the dynamic whitelist 402 if the IP address is associated with a malicious domain. In some cases, the system may continue to add the IP address to the dynamic whitelist 402 but tag the IP address with an indication that it has been found to be associated with a malicious domain.

In some embodiments, the system may determine whether any accounts associated with an IP address has been found to have logged-in from a country on the Office of Foreign Assets Control (OFAC) sanctions list. If an account has been associated with logins from a country on the OFAC sanctions list, the system may refrain from adding the associated IP address to the dynamic whitelist 402 in some embodiments.

At block 310, the one or more IP addresses may be added to the dynamic whitelist 402. For example, in the embodiment shown in FIG. 4, IP addresses 1.2.3.4, 2.3.4.5, 3.4.5.6, and 4.5.6.7 are added to the dynamic whitelist 402 in execution of the first task 302. As illustrated in the embodiment of FIG. 4, each of the IP addresses on the dynamic whitelist 402 may have associated metadata such as a timestamp of most recent activity and informational tags. In some embodiments, the number of IP addresses that may be added to the dynamic whitelist 402 during a current execution of the first task 302 may be limited (e.g., there may be a maximum limit) to keep the dynamic whitelist's 402 size manageable and reduce/eliminate the risk of unworthy IP addresses being added to the dynamic whitelist 402. For example, each time the first task 302 runs, a predefined number of IP addresses may be added to the dynamic whitelist 402, and once the maximum is reached, additional IP addresses are not added. In some cases, the additional IP addresses that are not added to the dynamic whitelist 402 once the maximum limit is reached may be queued for addition to the dynamic whitelist 402 at a later time such as the next time that the first task 302 executes. As a further example, a maximum number of IP addresses that can be added to the dynamic whitelist 402 may be a percentage number of the number of IP addresses added in a previous time period such as a last week or since the last execution of the first task 302. As a non-limiting, illustrative example, a maximum number of IP addresses that can be added may be no more than 15% more than the number of IP addresses added to the dynamic whitelist 402 last week (e.g., 15% threshold difference on a week-by-week basis). As such, spikes in additions to the dynamic whitelist 402 may be smoothed out to prevent abuse of the mechanics of the dynamic whitelist 402 by malicious users. In some embodiments, there may be exceptions to the percentage threshold on the week-by-week basis such as during times of expected higher network traffic. For example, during a holiday or large publicized sporting event, there may be higher network traffic expected, and thus, the percentage threshold may be increased for that time period. In some embodiments, the percentage threshold may be adjusted based on a total payment volume, revenue, or other metric related to the service provider. For example, where total payment volume for the service provider increases during a certain time period, the percentage threshold may proportionally increase to allow for more IP address additions to the dynamic whitelist 402.

In some embodiments, IP addresses may be added to the dynamic whitelist 402 preemptively through machine learning and/or clustering. For existing whitelisted IP addresses, the system may perform clustering (e.g., for good, healthy clusters) based on their ASNs, locations, ISPs, networks, organizations, institutions, and/or subnets. These groups/clusters may be preemptively added to the dynamic whitelist 402 such that they do not experience being blocked during a time period before they are added through the steps discussed in reference to blocks 308 and 310.

At block 303, the system executes the second task 304 at a second frequency. As further discussed below, in some embodiments, the second task 304 may include removing inactive IP addresses from the dynamic whitelist. In some embodiments, the second frequency may be less than the first frequency. In other embodiments, the second frequency may be the same or greater than the first frequency. At block 312 during execution of the second task 304, the system removes inactive IP addresses from the dynamic whitelist 402 (e.g., IP addresses where there has been an absence of incoming network traffic stemming from the IP address to the service provider). For example, the system may filter IP addresses from the dynamic whitelist 402 that have a timestamp of most recent activity that is earlier than a threshold time period in the past. To illustrate, the system may filter for IP addresses that have a timestamp of most recent activity going further back than a date/time of two weeks. To further illustrate, an IP address may have a timestamp of June 11, 9:00 AM. When the second task runs on June 27, 9:00 AM, and filters for IP addresses that have been inactive for the past two weeks (i.e., since June 13, 9:00 AM), then the IP address having the timestamp of June 11, 9:00 AM, would be captured in the filter for IP addresses that have been inactive. In some embodiments, the filtering may be part of query to a database where the dynamic whitelist 402 is stored to determine the IP addresses that have been inactive. IP addresses that are returned or otherwise identified to be inactive for the threshold time period, may be removed from the dynamic whitelist 402 by the system. For example, the system may update the dynamic whitelist 402 in the database to reflect the removal of the IP address from the dynamic whitelist 402. In the embodiment shown in FIG. 4, IP address 6.7.8.9 is removed in execution of the second task 304. The system may rescind any privileges and/or service accesses granted to the IP address upon its removal from the dynamic whitelist 402.

As discussed above, the time period for inactivity may be different for specific IP addresses. For example, the system may remove IP addresses associated with a merchant account if there is a longer period of time of inactivity and remove IP addresses associated with a customer account if there is a shorter period of time of inactivity, and vice versa. IP addresses that are dedicated may be removed after longer periods of time of inactivity as opposed to non-dedicated IP addresses, and vice versa. IP addresses that are static may be removed after a shorter period of time of inactivity as opposed to non-static IP addresses, and vice versa. Thus, in some embodiments, the system may filter IP addresses based on their metadata/tags and apply different removal criteria (e.g., time periods of inactivity) for different IP addresses.

At block 305, the system executes the third task 306 at a third frequency. As further discussed below, in some embodiments, the third task 306 may include determining IP addresses on the dynamic whitelist that have a risk score greater than a predetermined threshold and removing and/or tagging IP addresses on the dynamic whitelist that have a risk score greater than the predetermine threshold. In some embodiments, the third frequency may be greater than the second frequency of the second task 304 and greater than the first frequency (e.g. twice as frequent) of the first task 302. In other embodiments, the third frequency may be less than or the same as the second frequency and/or less than or the same as the first frequency. As an illustrative example, the first task 302 may run every two hours, the second task 304 may run every week, and the third task may run every hour. Executing the third task 306 at a greater frequency may allow for continuous removal/moving of abusive IP addresses from the dynamic whitelist 402 to reduce the risk of abusive IP addresses being added to and remaining on the dynamic whitelist 402. As some tasks may be more computationally expensive than others, staggering their execution through different frequencies may allow for preservation of computational power and allocation of computational resources to more critical tasks in a hierarchical fashion.

At block 314 in execution of the third task 306, the system may determine IP addresses on the dynamic whitelist that have a risk score greater than a predetermined threshold. In various embodiments, the risk score may indicate a likelihood that the IP address is associated with fraudulent or malicious activity such as attempts at circumventing security protocols and/or access protocols of the service provider for an IP address, attempts at abusing the service provider's resources or services (e.g., credential stuffing attacks), attempts at abusing chargeback policies, and so forth. For example, a security layer system for the service provider may have assigned a risk score to or increased a risk score for an IP address that was added to and/or exists on the dynamic whitelist 402. In some cases, the security layer system may include machine learning or artificial intelligence components that are used in assigning the risk score to the IP address. The system may communicate with the security layer system (e.g., query a database of information controlled/updated by the security layer system) to determine any IP addresses that have been assigned risk scores or have had their risk scores increased above the predetermined threshold. A risk score may be represented as a number or percentage in some embodiments.

As an illustrative example, where an IP address has been linked to a large number of accounts (e.g., incoming traffic from the IP address is associated with the large number of accounts) within a certain timeframe (e.g., a threshold number of accounts within a predetermined timeframe, e.g., 1,500 accounts within a two-hour timeframe), the IP address may have a greater risk score compared to IP addresses than have not been linked to a large number of accounts. In another example, where a single account is linked to a large number of IP addresses (e.g., incoming traffic associated with the single account stems from the large number of IP addresses) within a certain timeframe (e.g., a threshold number of IP addresses within a predetermined timeframe, e.g., 1,000 IP addresses within a two-hour timeframe), the IP addresses and account may be assigned a high risk score. In various embodiments, the system may send a query to a database to determine IP addresses on the dynamic whitelist 402 that have a risk score greater than the predetermined threshold. The database may be populated by various other systems and/or security layers of the service provider with IP address information, their risk scores, and other related information discussed herein.

At block 316 in execution of the third task 306, the system may remove/tag IP addresses on the dynamic whitelist 402 that have a risk score greater than the predetermined threshold. In one embodiment, the system may completely remove the IP addresses from the dynamic whitelist 402. For example, in the embodiment shown in FIG. 4, IP address 7.8.9.0 is removed from the dynamic whitelist 402 as the system determined that its risk score exceeds the predetermined threshold.

However, in some embodiments, an IP address with a risk score greater than the predetermined threshold may remain on the dynamic whitelist 402 but may be tagged with its risk score and an indication that the IP address has a risk score greater than the predetermined threshold. Thus, the IP address may remain on the dynamic whitelist 402 so that various security layers may analyze the network traffic stemming from the IP address to further improve security based on the analyzed behavior of the traffic stemming from the IP address while the tag allows for various systems and security layers to block the IP address at their individual level (e.g., as the traffic gets closer to the system core, it may be blocked). By tagging IP addresses on the dynamic whitelist 402 so that security layers can filter IP addresses as needed, computational resources at more expensive security layers may be preserved while security layers that are less computationally expensive at a security perimeter first analyze the IP addresses.

In some cases, a risk score of an IP address on the dynamic whitelist 402 may have increased since it was added to the dynamic whitelist 402 but the risk score does not exceed the predetermined threshold. In such cases, the IP address may remain on the dynamic whitelist 402 and also be copied to a secondary whitelist 404. For example, in the embodiment shown in FIG. 4, IP address 5.6.7.8 may have been determined in execution of the third task to have had an increase in its risk score since it was added to the dynamic whitelist 402 but the increase in its risk does not cause the risk score to exceed the predetermined threshold. Thus, IP address 5.6.7.8 may remain on the dynamic whitelist 402 and is copied to the secondary whitelist 404. The secondary whitelist 404 may be a whitelist that is used by one or more security layers of the service provider. For example, as shown in FIG. 5, a service provider may have a security system 500 comprising security layers 502a-502j which may each serve a different purpose in providing network security for the service provider. In an embodiment, as IP traffic traverses each of the security layers, starting from an outer perimeter and moving toward the core resource/service of the service provider, there may be an increase in stringency as to what traffic is allowed to pass (e.g., continue to flow through). In some embodiments, the dynamic whitelist 402 may act as a global whitelist to which each of the security layers may refer. Each of the security layers may also have one or more of their own local or secondary whitelists 404 so that IP traffic at each of the security layers may be evaluated against its own secondary whitelists 404 to determine whether the IP traffic is allowed to pass through the security layer or be blocked at the security layer.

As referred to herein, "downstream systems" and similar terms may refer to security layer systems that are relatively closer to the core resources/services of the service provider that traffic from IP addresses are attempting to access.

The foregoing disclosure is not intended to be limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system related to dynamic Internet Protocol (IP) address whitelisting, the system comprising:
   a non-transitory memory; and
   one or more hardware processors coupled to the non-transitory memory and configured to read instructions from the non-transitory memory to cause the system to perform operations comprising:
   executing a first, the first task comprising:
   determining, based on registered account activities corresponding to registered accounts with a service provider, at least one IP address associated with at least one registered account with the service provider; and adding the at least one IP address to a dynamic whitelist of IP addresses, wherein the IP addresses on the dynamic whitelist of IP addresses are granted greater access to network services of the service provider than IP addresses excluded from the dynamic whitelist;
monitoring, after the at least one IP address has been added to the dynamic whitelist of IP addresses, the at least one registered account for a specified period of time;
determining, based on the monitoring, that the at least one IP address has become inactive; and
executing, after the determining that the at least one IP address has become inactive, a second task, the second task comprising: removing, from the dynamic whitelist, the at least one IP address identified as inactive.

2. The system of claim 1, wherein the at least one IP address is added to the dynamic whitelist up to a predefined maximum number of IP addresses allowed to be added to the dynamic whitelist over a predetermined time period.

3. The system of claim 1, wherein the first task further comprises:
   determining the registered account activities performed since a last time that the first task was executed, wherein the registered account activities comprises at least one of an Application Program Interface (API) call or a logged performance of a transaction using the network services of the service provider;
   determining IP addresses associated with the registered account activities; and
   cross-checking the IP addresses associated with the registered account activities against existing IP addresses on the dynamic whitelist, wherein the at least one IP address is determined to be new based on the cross-checking.

4. The system of claim 3, wherein the first task further comprises:
   cross-checking the at least one IP address against IP addresses on a red flagged list, the red flagged list comprising IP addresses that have been identified to be associated with malicious use; and
   tagging the at least one IP address that matches an IP address on the red flagged list as being associated with malicious use prior to being added to the dynamic whitelist.

5. The system of claim 1, wherein the determining that the at least one IP address has become inactive is based on the monitoring indicating an absence of network traffic corresponding to the at least one IP address during the specified period of time.

6. The system of claim 1, wherein the operations further comprise executing a third task, the third task comprising:
   determining a further IP address on the dynamic whitelist that has a risk score greater than a predetermined threshold, wherein the risk score indicates that the further IP address has been identified by a separate system as being associated with malicious use.

7. The system of claim 6, wherein the third task further comprises:
   removing, from the dynamic whitelist, the further IP address.

8. The system of claim 6, wherein the third task further comprises:
   tagging the further IP address on the dynamic whitelist with a tag that indicates that its risk score is greater than the predetermined threshold.

9. The system of claim 1, wherein the operations further comprise executing a third task, the third task comprising:
    removing a further IP address on the dynamic whitelist that has been server request rate-limited more than a threshold number of times over a predetermined time period.

10. The system of claim 1, wherein:
    the first task further comprises timestamping the at least one IP address with a time of last activity associated with the at least one IP address; and
    the determining that the at least one IP address has become inactive is based on a threshold amount of time of inactivity that has passed since the time stamp of the at least one existing IP address.

11. A method for dynamic Internet Protocol (IP) address whitelisting, the method comprising:
    executing a first task, the first task comprising:
        determining IP addresses corresponding to customer accounts associated with a service provider;
        adding the IP addresses to a dynamic whitelist indicative of IP addresses granted greater access to network services of the service provider relative to IP addresses excluded from the dynamic whitelist;
        determining, after the IP addresses have been added to the dynamic whitelist, that a first IP address of the IP addresses has become inactive, wherein the determining is based on a network traffic associated with the first IP address; and
    executing, after the determining that the first IP address has become inactive, a second task, the second task comprising:
        removing, from the dynamic whitelist, the first IP address.

12. The method of claim 11, wherein the first task further comprises:
    determining one or more IP addresses associated with network traffic for the service provider that occurred since a last execution of the first task; and
    cross-checking the one or more IP addresses against existing IP addresses on the dynamic whitelist, wherein the determining the IP addresses is based on the cross-checking.

13. The method of claim 12, wherein the network traffic comprises at least one of a customer account sign-in, a customer account sing-up, or a customer account transaction entry.

14. The method of claim 13, wherein the first task further comprises:
    cross-checking the IP addresses against IP addresses corresponding to a red flagged list; and
    tagging any of the IP addresses that match an IP address on the red flagged list prior to being added to the dynamic whitelist.

15. The method of claim 11, wherein the first task further comprises timestamping each of the IP addresses with a time of a most recent network traffic activity for the service provider.

16. A non-transitory machine-readable medium having stored thereon machine-readable instructions executable to cause a machine to perform operations comprising:
    determining one or more IP addresses associated with accounts registered with a service provider;
    adding the one or more IP addresses to a dynamic whitelist indicative of IP addresses granted greater access to application services of the service provider relative to IP addresses excluded from the dynamic whitelist;
    monitoring a network traffic of each of the one or more IP addresses;
    determining, based on the monitoring, that a first IP address on the dynamic whitelist that is associated with an absence of network traffic within a previous time period has become inactive; and
    in response to determining that the first IP address has become inactive, removing, from the dynamic whitelist, the first IP address.

17. The non-transitory machine-readable medium of claim 16, wherein the operations further comprise
    identifying a second IP address on the dynamic whitelist that has a risk score greater than a predetermined threshold based on a cross-check to a separate red list comprising IP addresses and their risk scores, wherein the risk score is indicative of a percentage of association to malicious use of the application services of the service provider; and
    tagging the second IP address with an indication that the second IP address has the risk score greater than the predetermined threshold.

18. The non-transitory machine-readable medium of claim 17, wherein the operations further comprise:
    removing, from the dynamic whitelist, the second IP address; and
    adding the second IP address to a secondary whitelist for analyzing a security risk of the second IP address using a downstream system.

19. The non-transitory machine-readable medium of claim 17, wherein:
    the determining the one or more IP addresses and the adding the one or more IP addresses are performed as a part of a first task, the first task having a first execution frequency;
    the removing is performed as a part of a second task, the second task having a second execution frequency;
    the identifying and the tagging are performed as a part of a third task, the third task having a third execution frequency;
    the second execution frequency is less than the first execution frequency; and
    the third execution frequency is greater than the second execution frequency and greater than the first execution frequency.

20. The non-transitory machine-readable medium of claim 16, wherein the network traffic comprises at least one of a customer account sign-in, a customer account sing-up, or a customer account transaction entry.

* * * * *

UNITED STATES PATENT AND TRADEMARK OFFICE
CERTIFICATE OF CORRECTION

PATENT NO. : 11,689,531 B2
APPLICATION NO. : 16/912209
DATED : June 27, 2023
INVENTOR(S) : George Chen Kaidi Page 1 of 1

It is certified that error appears in the above-identified patent and that said Letters Patent is hereby corrected as shown below:

In the Claims

Claim 1, Column 15, Line 62, change "executing a first," to --executing a first task,--.

Signed and Sealed this
Twenty-second Day of August, 2023

Katherine Kelly Vidal
*Director of the United States Patent and Trademark Office*